April 28, 1959 G. G. ENSIGN ET AL 2,883,827
ELECTRICALLY ACTUATED HOROLOGICAL INSTRUMENT
Filed Aug. 4, 1953 4 Sheets-Sheet 4
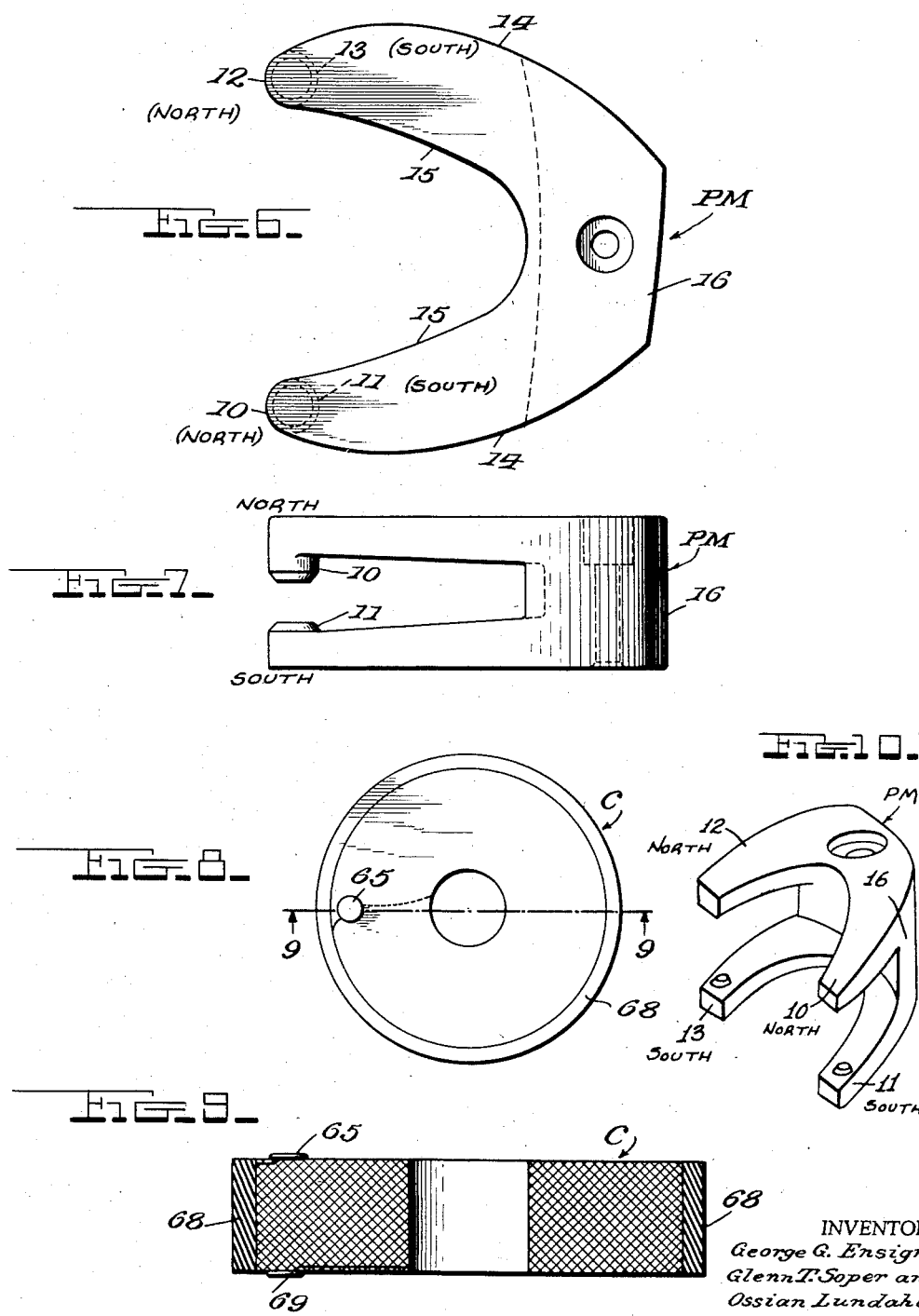
INVENTORS
George G. Ensign,
Glenn T. Soper and
Ossian Lundahl
BY Mason, Porter, Diller & Stewart,
ATTORNEYS United States Patent Office 2,883,827
Patented Apr. 28, 1959

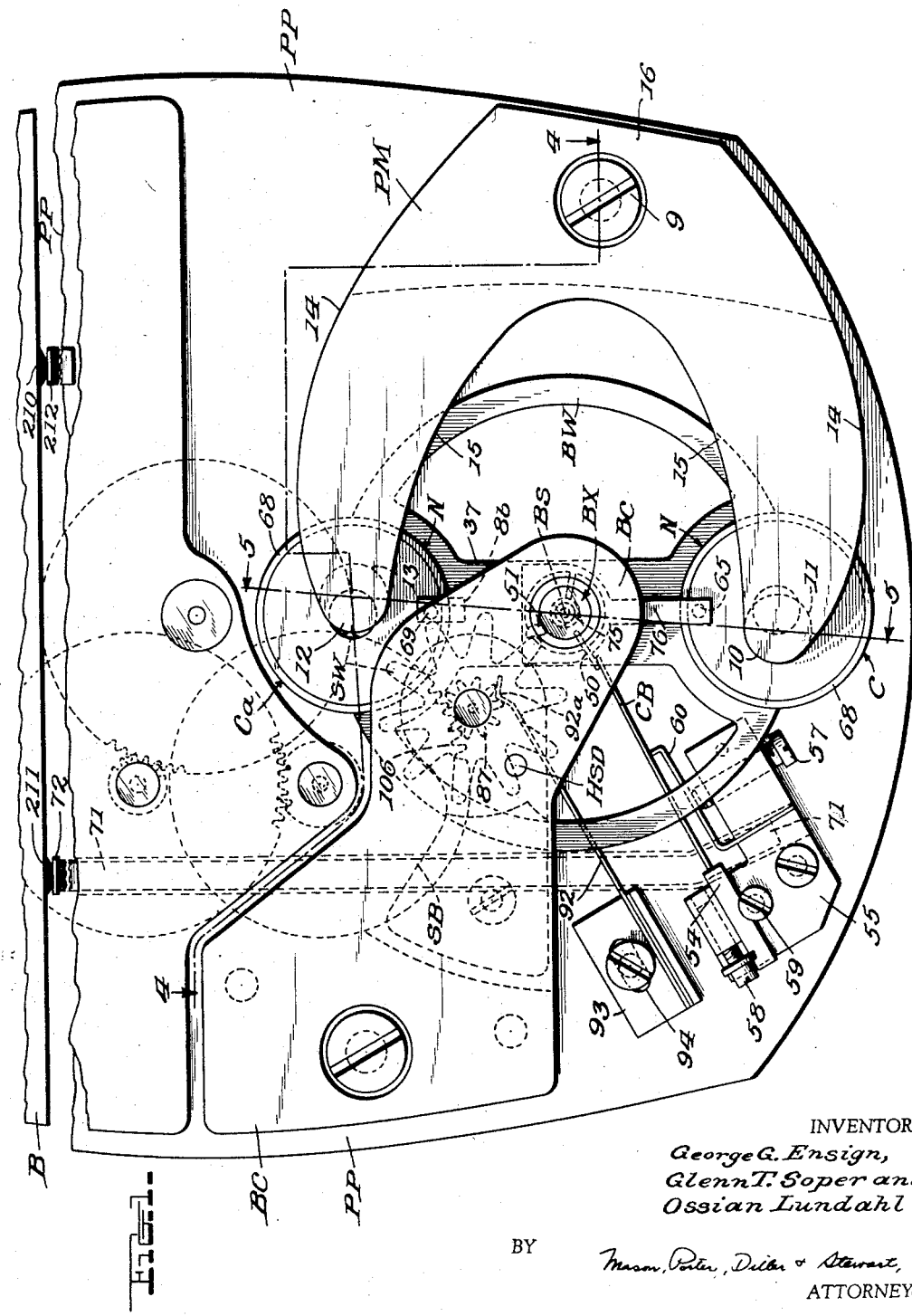

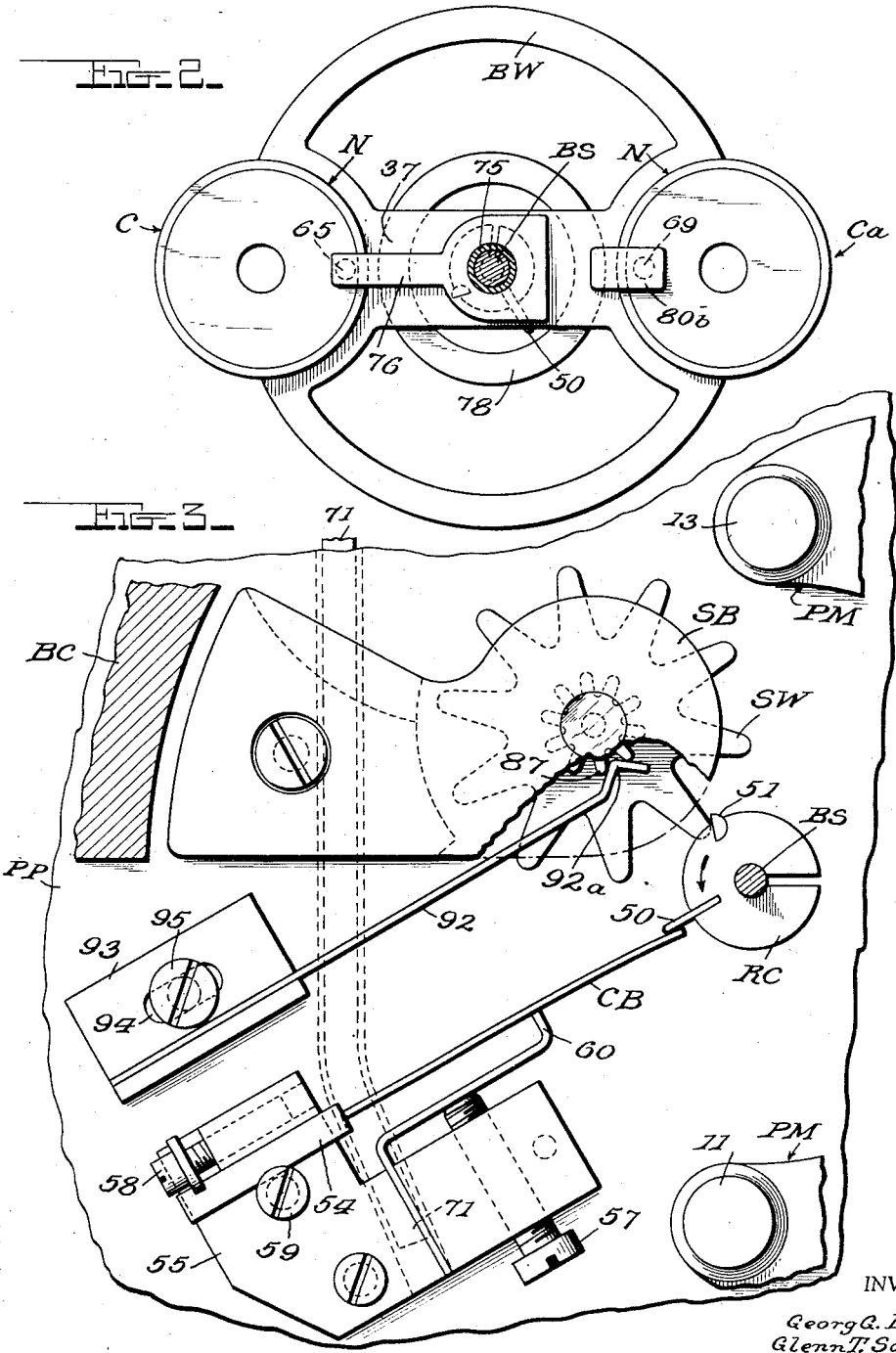

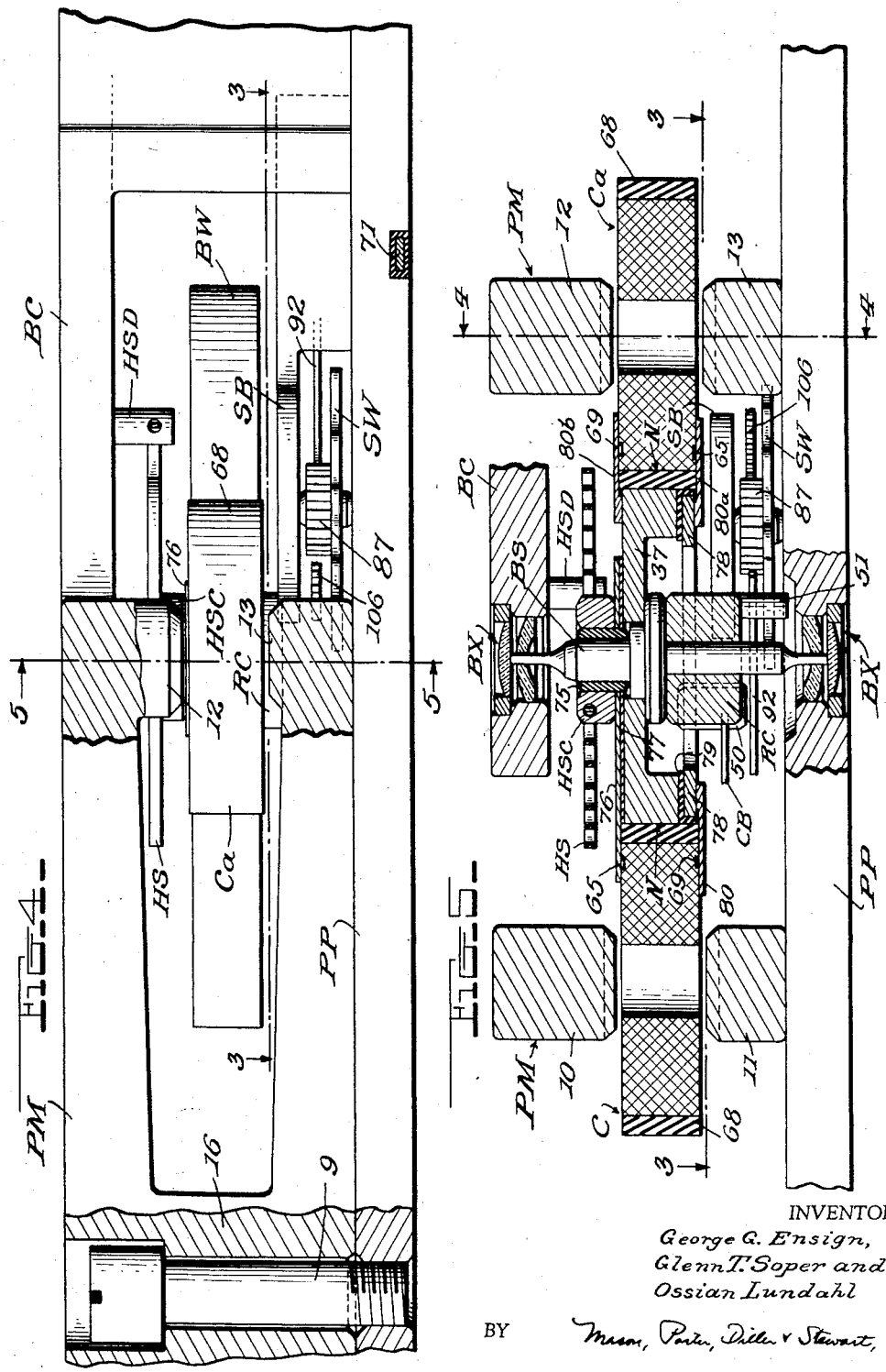

2,883,827

ELECTRICALLY ACTUATED HOROLOGICAL INSTRUMENT

George G. Ensign and Glenn T. Soper, Elgin, Ill., and Ossian Lundahl, Orlando, Fla., assignors to Elgin National Watch Company, Elgin, Ill., a corporation of Illinois Application August 4, 1953, Serial No. 372,216

7 Claims. (Cl. 58—28)

This invention relates to electrically actuated horological instruments, for example watches, in which impulses are delivered to the balance system, for maintaining oscillation thereof, by magnetization of balance-carried members by electric current impulses determined by the balance operation.

A feature of this invention is the provision of a horological instrument having a hairspring and balance system, an electrical winding carried by the balance, a cooperative magnetic element on the instrument frame, and current supplying and conductor means including a contact periodically made and broken during the oscillation cycle.

Another feature is the provision of a horological instrument having a hairspring and balance system with a balance wheel rim of non-magnetizable material, and having peripheral notches, electrical windings supported in said notches, a cooperating permanent magnet on the instrument frame presenting pairs of pole pieces opposite the path of the windings, and current supplying and conductor means including a contact made and broken during the oscillation cycle. Another feature is the provision of a horological instrument having a hairspring and balance system with a balance wheel having diametrically opposed peripheral notches, a pair of electrical winding units supported in said notches with the winding axes parallel to the balance axis, a cooperating permanent magnet having projecting pairs of pole pieces of opposite pole, said pairs being diametrically opposite one another across the balance axis and with the pole pieces of each pair spaced for movement of the windings therebetween.

A further feature is the provision of a balance assembly in which the balance wheel supports electrical windings, and a stator magnet has pairs of oppositely polarized pole pieces located for passage of the electrical windings therebetween, and with conductor pieces and elements carried by the balance for connecting the windings in circuit, and including relatively insulated parts spaced axially and to and through which the circuit is completed.

With these and other features as objects in view, as will appear in the course of the following description and claims, an illustrative embodiment of the invention is shown on the accompanying drawings, in which:

Fig. 1 is a general plan view of an electrically actuated watch according to this invention;

Fig. 2 is a plan view of a balance wheel rim with electrical windings thereon, on a larger scale;

Fig. 3 is a plan view, substantially on line 3—3 of Figs. 4 and 5, showing contact and power take-off parts;

Fig. 4 is an upright section of parts of the structure, substantially on line 4—4 of Figs. 1 and 5, with the stator magnet in elevation;

Fig. 5 is a corresponding section, substantially on lines 5—5 of Figs. 1 and 4;

Figs. 6 and 7 are respectively plan and edge views of the stator magnet piece of Figs. 1–4;

Figs. 8 and 9 are respectively plan and sectional views of a rotor coil as illustrated in Figs. 1–4.

Fig. 10 is a perspective view of the stator assembly.

In these drawings, a pillar plate PP is connected by a screw 9 to a stator magnet PM (Figs. 6–7) having two pairs of projecting pole pieces 10, 11 and 12, 13, the upper poles 10, 12 (Figs. 7 and 10) being north and the lower pole pieces 11, 13 (Figs. 7 and 10) being south. Preferably the magnet PM has arcuate edges 14, 15 leading from the body portion 16 and providing structures of diminishing cross section (Fig. 6) to the ends which have the pole extensions (Fig. 7) toward one another whereby to concentrate the magnetic effects to limited areas. These pairs of extensions are coaxial about lines parallel to the balance axis. In the illustrated form, the stator body PM is of permanently magnetic material.

A balance cock BC is connected to the pillar plate PP. Bearings BX of insulating material, e.g. sapphire, in the plate PP and balance cock BC support the balance staff BS having thereon the hairspring collet HSC with the connected hairspring HS extending to the hairspring stud HCD secured to the balance cock BC. A roller collet RC carries a conductively mounted contact fin 50 and a jewel pin 51 of insulating material such as sapphire.

During oscillation of the balance, as the fin 50 comes to the neutral axis, i.e. to the mid-point of each stroke, and thus is at its maximum velocity, it encounters and flexes the contact blade CB insulatedly carried by the support 54 on the insulating block 55 fixed on the plate PP. Side contact member 60 is engaged by the blade CB upon actuation of the latter by the fin 50 when the balance assembly is moving in the counterclockwise direction shown by the arrow in Fig. 3.

The balance staff BS has a diametrical arm 37 and a balance wheel rim BW, the latter having two diametrically opposed notches N, N for receiving and supporting the electrical windings or coils C, Ca, which have their winding axes parallel to the balance axis, and project slightly above and below the rim BW. As the rim BW oscillates, the coils are carried between the pairs of magnetic poles 10, 11 and 12, 13, with a small magnetic air gap clearance. Therewith, when the balance is passing the neutral axis (Fig. 5), the electrical winding C is coaxial with pole pieces 10, 11 and the winding Ca is coaxial with pole pieces 12, 13.

The balance system has the hairspring collet HSC isolated electrically from the balance staff BS by the insulating material 75, but in conductive electrical relation to the conductor piece 76 having a hole for receiving the staff BS and the insulating sleeve 75 and itself isolated from the arm 37 by the insulating film 77 of adhesive cement. Each coil C, Ca has terminal contacts 65, 69 on its faces (Figs. 8 and 9), and the piece 76 engages the contact 65 of coil C. A conductive ring 78 is mounted on but isolated from the balance wheel by a film of insulating cement 79. A conductive film 80 extends from the ring 78 to terminal 69 of the coil C; and a like film 80a extends from the ring 78 to the contact 65 of coil Ca. A conductive film 80b extends from the contact 69 of coil Ca to the balance rim and arm 37, whereby this contact 69 of coil Ca is electrically connected to the conductive fin 50.

As shown in Fig. 1, a battery B is connected at a terminal 211 to the end 72 of a conductor 71 insulatedly carried (Fig. 4) by the pillar plate PP and connected electrically to the side contact 60, so that a pulse of current flows through the coils C, Ca at each stroke, at a time and for a duration determined by the action of the contact fin 50 upon the contact blade CB. Illustratively the battery B is connected at its terminal 210 to a connection piece 212 on the illustrated pillar plate PP, and thus with the hairspring stud HSD, whence the flow continues through the hairspring HS to the collet HSC and thence as described above through the coils C, Ca in series by the path HSC—76—C—80—78—80a—Ca—80b—37—BS—conductive fin 50; it being noted that the sapphire jewels BX maintain the balance staff BS electrically insulated from the plate PP and balance cock BC. The side contact 60 is joined by aforesaid conductor 71 to the other terminal 211 of the battery B.

The duration of the electrical contact or circuit-making is adjustably determined by the distance by which the contact blade CB projects beyond the path of the outermost part of the fin 50. The block 54 is movable toward and from the balance axis by turning the screw 58 seated in the block 55 and having a flange engaged in a kerf of the block 54. Screw 59 locks the block 54 between adjustments. The screw 57 permits regulating the positions of the side contact 60 relative to the contact blade CB.

The coils C, Ca are illustratively identical, being wound of insulated wire, and having an open or air core. After winding, they are saturated with cement of insulating type; and the end leads are held down to the end faces, with spots of conductive cement forming the end terminals 65, 69. A peripheral insulating jacket 68 is preferably used, with an outer diameter closely approximating the walls of notches N. Insulating cement is applied to the notch walls and the mating parts of the coils, and the parts assembled and the cement dried so that a rigid assembly is formed. Insulating cement is applied for the films 77, 79, and the pieces 76, 78 are seated, preferably with a droplet of conductive cement between the piece 76 and the contact 65 of coil C. Conductive cement is applied for the films 80, 80a, 80b. The assembly is then heat-treated for final drying and curing. A suitable conductive cement comprises a synthetic resin in a solvent, with conductive particles such as silver or graphite.

In operation, as the fin 50 in a counterclockwise stroke encounters the contact blade CB, this blade is flexed and thus placed under a preliminary stress and its length is bowed until contact is made between the blade CB and side contact 60. A tentative circuit extends from battery B by the pillar plate PP and the element conductively related thereto, through the hairspring HS and the coils Ca, C, in series to fin 50 and is extended to the contact blade CB when the fin and blade make contact, but this circuit is not completed, as the blade CB is insulatedly carried by the block 54. When the blade CB encounters the side contact 60, the circuit is completed by conductor 71 so that current flow occurs through the coils C, Ca shortly after the instant that the axes of coils C, Ca are respectively coincident with the axes of pole pieces 10, 11 and 12, 13, e.g. as indicated in Fig. 1, and these coils become charged and establish opposing magnetic poles to the pole pieces, north to north and south to south, so that repulsion occurs and the balance system receives an electrically induced and magnetically effective impulse for maintaining the oscillation thereof. It will be noted that the final circuit closure between blade CB and side contact 60 does not occur until the contact blade CB is under initial stress, whereby vibration and successive make-and-break effects do not occur, but instead a predetermined and regular amount of electrical energy is delivered for each closure action and at a predetermined phase relation in the oscillation cycle. Shortly after the closure, in terms of the amplitude of oscillation of the balance system, the contact fin 50 has bent the contact blade CB in front of it so that in its own arcuate movement it escapes from the blade and permits the blade to spring back to its own normal central position free of the side contact 60. If the contact blade CB vibrates, and the blade again engages the contact 60, no circuit closure occurs because the circuit is now interrupted between the fin 50 and the blade CB: hence only a single current pulse occurs, beginning at a predetermined point of the cycle, lasting for a predetermined duration, and ending at a second predetermined part of the cycle; and thus a close control is maintained upon the impulsing and the regularity of movement of the balance system. During the retrograde stroke of each cycle, when the fin 50 encounters and stresses the blade CB, no contact closure occurs, as the blade bends for substantially its length and in a direction away from the contact 60. A characteristic of this illustrated arrangement is that the final contact is made at the contact 60, and that the circuit breaking occurs at the contact fin 50.

While the balance system is moving through the major part of its forward and return strokes (of about 540 degrees each), the coils are electrically open-circuited and essentially without magnetic effect, except for the circuit closure times of about 15 degrees once in each cycle, so that only insignificant current effects are induced therein by their movements opposite magnetic members, and such effects are themselves regular and can be compensated during construction and by minor adjustments of the block 54 and screws 57, 58. It will be noted that the magnetic fields of the stator magnet are of restricted cross-sections, and of high magnetic density, so that varying earth magnetic fields, or changes of watch position, have no significant effect upon the going of the watch, particularly in view of the point that the parts of the balance system can be entirely of non-magnetic and non-magnetizable materials.

The balance system is limited in axial movement by the end stones in the balance staff bearings BX, and the hole stones restrict tilting, so that the coils C, Ca are carried in closely determined paths, and the mechanical spacings at the magnetic air gaps between the pole pieces and the coils may be very small, e.g. 0.001 inch in a wrist watch, wherewith the reluctance is low and the efficiency very high. For example, an electrically actuated wrist watch has been operated at an averaged current demand of 6 microwatts. In this structure, the coils C, Ca had an internal diameter of 0.030 inch; an external diameter of 0.130 inch, and a thickness of 0.030 inch: each coil had 3000 turns of enamel-insulated copper wire of a diameter of 0.00055 inch.

The pin 51 is part of a power take-off or transfer system by which the balance system actuates a train and thus indicating hands. As the pin 51 comes (Fig. 3) to the neutral axis in the counterclockwise stroke of the balance system, it engages a point of the star wheel SW pivoted in the pillar plate PP and a bridge SB, advances the star wheel by the angle representing the spacing of the points and then escapes to continue to the end of the counterclockwise stroke. The detent spring 92 has an end 92a of V-shape, normally resting in a gap between two teeth of the pinion 87, on which the star wheel SW is mounted, this pinion being in driving relation to the train by its meshing with wheel 106 thereof. When the star wheel is advanced by the aforesaid angle, the detent spring end 92a is raised by a pinion tooth, and then moves back into the next tooth gap. During the return stroke of the balance system, the jewel pin 51 passes the star wheel point which has just been advanced, and strikes the next succeeding point, and produces a minor retrograde movement of the star wheel SW, the detent end 92a being then only slightly lifted, but this retrograde movement is less than the forward movement: for example when the star wheel SW and the pinion 87 have ten points or teeth, the angular spacing is 36 degrees, and the forward movement is 36 degrees, with a retrograde movement of about 7 degrees. The pin 51 escapes from the star wheel point and continues to the end of the return stroke. When the star wheel point is thus released, the detent 92 acts on the pinion tooth to cause the star wheel to return to its immediately prior position, ready to be encountered by the pin 51 in the forward stroke of the next oscillation cycle and advanced by another step. The detent spring 92 is carried by a block 93 having a slot 94 through which passes the securing screw 95: by moving the block 93, the spring tension at the end 92a, and the relative tangential position of this end and therewith the presentation of the star wheel points to the pin 51, may be regulated.

Such a power take-off, in the stated example of practice, operated with an energy input of about 1 to 1½ microwatts, and effected the requisite time-keeping movement of the usual hour, minute, and sweep-second hands.

It is obvious that the invention is not restricted to the illustrative embodiment, but may be employed in many ways within the scope of the appended claims.

We claim:

1. In an electrically actuated timepiece, a support, an oscillatory balance assembly journalled on the support and having a balance portion and a pair of electrical coils mounted on the balance portion and located diametrically opposite one another across the balance axis with their axes parallel to the balance axis, a conductor on the assembly connecting said coils in series, a conductive contact fin oscillating concurrently with the balance assembly, a contact member insulatedly mounted on said support and cooperating with the contact fin, a piece insulatedly mounted on the balance and electrically connected to one of said coils, a first conductor means connecting the other coil to said fin, a second conductor means for supplying current and connected to said piece and said contact member; and a supported permanent magnetic stator having a body portion with oppositely magnetized ends, and pairs of arms extending from the ends of the said body portion, each pair of arms extending in a respective plane radial with respect to the balance axis with one pair at one face of the balance portion and the other pair at the other face thereof, each arm having a pole piece with the pole pieces of each pair having the same magnetic polarity and being axially alined with and spaced from the pole pieces of the other pair along axis lines parallel to the balance axis, said axis lines being spaced from the balance axis so that the coil axes momentarily coincide with said axis lines during the balance oscillation.

2. In an electrically actuated timepiece, a support, a balance assembly pivotally carried by the support and having a pair of electrical coils mounted thereon diametrically opposite one another with their axes parallel to the balance axis, and a magnetic structure on the support and having a part radially outside the path of said coils and including projections extending at each side of the path of the coils and including pole pieces in pairs located diametrically opposite one another across the balance axis, the pole pieces at one side of said path having one magnetic polarity and the pole pieces at the other side thereof having the other magnetic polarity, said pole pieces of each pair being of opposite polarity and being spaced apart axially for movement of said coils therebetween, said projections being of decreasing section from said part toward the pole pieces, and the pole pieces being present as extensions toward one another in each pair from the receptive projections.

3. In an electrically actuated timepiece, a support; an oscillatory balance assembly mounted on the support and comprising an oscillating element having eccentric openings located diametrically opposite one another across the balance axis, electrical coils having their axes parallel to the balance axis and mounted in said openings and projecting at each face beyond the element; and a stator magnet mounted on the support with a body portion having oppositely polarized ends spaced in the direction of the balance axis, pairs of projections from each end of the body portion, with one pair at one face of the oscillating element and the other pair at the other face thereof, and pole pieces on said projections and having their faces adjacent to the oscillating element located in respective planes radial to the balance assembly axis and spaced apart for movement of the coils between groups of said pole pieces, the pole pieces of each group being alined along respective axis lines parallel to the balance axis with said axis lines diametrically opposite each other across the balance axis, whereby the coil axes momentarily coincide with the said group lines during balance assembly oscillation, the pole pieces in each said radial plane being of like polarity; said faces of the coils having lesser clearance from said pole pieces than that of adjacent parts of the oscillatory element.

4. In an electrically actuated timepiece, a support, a balance assembly pivotally carried by the support and including peripherally spaced electrical coils mounted with their axes parallel to the balance axis, and a stator magnet on the support and having a body portion with its ends spaced in a direction parallel to the balance axis, the ends of the body portion having extensions therefrom provided with pole pieces, the pole pieces connected to one said end having one magnetic polarity and the pole pieces connected to the other end having the other magnetic polarity, said pole pieces being grouped with each group having a pole piece of each polarity located along a respective group line which is parallel to the balance axis and is positioned for coincidence with the coil axes during the balance oscillations, the pole pieces of each group being spaced apart for movement of said coils therebetween with the coil axes momentarily coincident with the said group lines, the groups being spaced about the axis of the balance assembly so that coincidence of said coil axes and pole piece lines is concurrent for all groups.

5. In an electrically actuated timepiece, a support, a balance assembly pivotally carried by the support and including peripherally spaced electrical coils and a stator magnet on the support and having a body portion having its ends of opposite magnetic polarity, said ends being spaced apart in a direction parallel to the balance axis, the ends of the body portion having extensions therefrom provided with pole pieces, the pole pieces connected to one said end having one magnetic polarity and the pole pieces connected to the other end having the other magnetic polarity, said pole pieces being grouped with each group having a pole piece of each polarity located along a respective group line which is parallel to the balance axis, with the pole pieces of each group being spaced for the movement of said coils therebetween and positioned for momentary coincidence of the coil axes with said lines during the balance oscillations, the groups being spaced about the axis of the balance assembly so that coincidence of said coil axes and pole piece lines is concurrent for all groups.

6. In an electrically actuated timepiece, a support, a balance assembly pivotally carried by the support and having a pair of electrical coils mounted thereon diametrically opposite one another with their axes parallel to the balance axis, and a magnetic stator on the support and having a body portion radially outside the path of said coils with its ends spaced in the direction parallel to the balance axis, said ends being of opposite magnetic polarities and having projections located in respective planes radial to the balance axis and having pairs of pole pieces of like magnetic polarities located in the respective plane and diametrically opposite one another across the balance axis, the pole pieces being arranged in groups of opposite magnetic polarity with each group alined along a respective line parallel to the balance axis and spaced at such distance therefrom that the coil axes momentarily coincide with the said lines during the balance assembly oscillation, the pole pieces in each group being spaced along the respective group line for movement of the coils therebetween.

7. A permanent magnet stator for an electrically actuated timepiece, comprising a body portion having oppositely magnetized ends, a first pair of arms extending from one end of said body portion, a second pair of arms extending from the other end of said body portion, each pair of arms extending in a respective plane at right angles with respect to the axis of the body portion, and pole pieces located with one pole piece on each arm, the arms being of diminishing section from the body portion toward the pole pieces, the pole pieces on each pair of arms having the same magnetic polarity and being alined with and spaced from the pole pieces of the other pair along axis lines parallel to the axis of the body portion.

References Cited in the file of this patent

UNITED STATES PATENTS 2,598,912     Held _____ June 3, 1952

FOREIGN PATENTS

| | | |
|---|---|---|
| 21,616 | France | Aug. 24, 1920 |
| | (Addition to 494,398) | |
| 501,215 | France | Jan. 19, 1920 |
| 523,885 | France | Apr. 30, 1921 |
| 944,517 | France | Nov. 2, 1948 |
| 1,024,764 | France | Jan. 10, 1953 |
| 246,547 | Italy | Mar. 27, 1926 |